(12) United States Patent
Harwell et al.

(10) Patent No.: US 9,331,886 B2
(45) Date of Patent: May 3, 2016

(54) MAGNETIC FIELD DATA MODEM

(71) Applicant: KONINKLIJKE PHILIPS N.V., Eindhoven (NL)

(72) Inventors: Robert Harwell, Saint Cloud, FL (US); Otis Robert Harris, Orlando, FL (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/353,295

(22) PCT Filed: Oct. 19, 2012

(86) PCT No.: PCT/IB2012/055726
§ 371 (c)(1),
(2) Date: Apr. 22, 2014

(87) PCT Pub. No.: WO2013/061222
PCT Pub. Date: May 2, 2013

(65) Prior Publication Data
US 2014/0254646 A1 Sep. 11, 2014

Related U.S. Application Data

(60) Provisional application No. 61/551,025, filed on Oct. 25, 2011.

(51) Int. Cl.
*H04B 1/38* (2015.01)
*H04L 5/16* (2006.01)
(Continued)

(52) U.S. Cl.
CPC .............. *H04L 27/36* (2013.01); *H04B 5/0031* (2013.01); *H04B 5/0087* (2013.01); *H04L 27/38* (2013.01)

(58) Field of Classification Search
CPC .... H04M 11/06; H04M 11/062; H04L 25/4927; H04L 5/1438; H04L 27/2608; H04L 27/36; H04L 27/38; H04B 5/0031; H04B 5/0087
USPC ......................................................... 375/222
See application file for complete search history.

(56) References Cited

U.S. PATENT DOCUMENTS 5,877,732 A * 3/1999 Ziarati ........................... 345/8
6,219,529 B1  4/2001 Kimura et al.
(Continued)

FOREIGN PATENT DOCUMENTS

WO          9942039 A1    8/1999

*Primary Examiner* — Nader Bolourchi

(57) ABSTRACT

A magnetic field modem (26) includes an electro-magnetic radiation shielded (90) transmitter section (34) and a receiver section (36). The electro-magnetic radiation shielded (90) transmitter section (34) modulates data and transmits the data via a magnetic field through a radio frequency shield (20). The receiver section (34) receives the magnetic field through the radio frequency shield (20) and demodulates the data. The transmitter section includes an oscillator (40), a modulator (50), an amplifier (70), a magnetic transducer (80), and a non-ferrous magnetic shield (90). The oscillator (40) generates a carrier signal. The modulator (50) connects to the oscillator (40) and modulates the carrier signal with the data. The amplifier (70) connects to the modulator (50) and amplifies the modulated carrier signal. The magnetic transducer (80) connects to the amplifier (70) and converts the modulated carrier signal into a modulated magnetic signal. The non-ferrous magnetic shield (90) shields the magnetic transducer (80) and blocks emitted electro-magnetic radiation.

19 Claims, 6 Drawing Sheets

(51) Int. Cl.
  *H04L 27/36* (2006.01)
  *H04B 5/00* (2006.01)
  *H04L 27/38* (2006.01)

(56) References Cited

U.S. PATENT DOCUMENTS

| | | | | |
|---|---|---|---|---|
| 6,400,155 | B2 * | 6/2002 | Kormos et al. | 324/318 |
| 6,585,763 | B1 * | 7/2003 | Keilman et al. | 623/1.42 |
| 2003/0058502 | A1 | 3/2003 | Griffiths et al. | |
| 2004/0120723 | A1 * | 6/2004 | Ito | 399/12 |
| 2004/0196043 | A1 * | 10/2004 | Branch et al. | 324/318 |
| 2005/0107681 | A1 | 5/2005 | Griffiths | |
| 2005/0203389 | A1 * | 9/2005 | Williams | 600/431 |
| 2005/0283068 | A1 | 12/2005 | Zuccolotto et al. | |
| 2007/0285021 | A1 | 12/2007 | Jauster et al. | |
| 2008/0299904 | A1 | 12/2008 | Yi et al. | |
| 2010/0227557 | A1 * | 9/2010 | Won et al. | 455/41.2 |
| 2010/0317961 | A1 | 12/2010 | Jenkins et al. | |

\* cited by examiner

MAGNETIC FIELD DATA MODEM

CROSS REFERENCE TO RELATED APPLICATIONS

This application is a national filing of PCT application Serial No. PCT/IB2012/055726, filed Oct. 19, 2012, published as WO 2013/061222 A1 on May 2, 2013, which claims the benefit of U.S. provisional application Ser. No. 61/551,025 filed Oct. 25, 2011, which is incorporated herein by reference.

The present application relates to data communications, modems, and magnetic fields, and specifically to data communications in a magnetic resonance imaging environment.

Magnetic resonance imaging is conducted in rooms which are shielded from radio frequency waves. Radio frequency (RF) coils are used to excite magnetic resonance in a subject and to receive the weak radio frequency magnetic resonance signals. Outside radio frequency waves can negatively impact the imaging. MRI scanners are typically installed in rooms which are shielded against outside radio frequency radiation. The shielding often used is non-ferrous shielding such as copper or aluminum which covers the wall, ceiling, and floor surfaces of the MR room. The shielding of the room is sometimes referred to as a Faraday cage.

Communication to and from the scanner, the subject, or an associated device with outside sources passes through this shielding. Data communicated between the control room and the scanner room includes patient parameters, patient monitoring data, MRI imaging data, and the like. Even a small hole in the shielding can leak significant amounts of stray RF contamination. Various techniques are used to allow communication with the RF shielded room. Many of these techniques involve an aperture through the shielding. Optic fibers, waveguides, and passive antennas are exemplary. Once the hole is formed, elaborate shielding efforts are implemented to stop stray RF leakage. Some MR rooms have windows with sufficient electrical conductivity, e.g. due to a fine embedded mesh screen, that they function as a part of the Faraday cage. Optical and infra-red communications can pass through such windows but requires window space and equipment located in specific places.

Communication using a RF field avoids the magnetic field frequencies used by the magnetic resonance scanner. Gradient coils typically use frequencies in the kilo-hertz range. Resonance frequencies are in the mega-hertz range.

The present application provides a new and improved magnetic data modem which overcomes the above-referenced problems and others.

In accordance with one aspect, a magnetic field modem includes an electro-magnetic radiation shielded transmitter section and a receiver section. The electro-magnetic radiation shielded transmitter modulates data and transmits the data via a magnetic field through a radio frequency shield. The receiver section senses the magnetic field through a radio frequency shield and demodulates the data.

In accordance with another aspect, a method for communicating data through a RF shield includes receiving data with a first modem unit on a first side of the RF shield. The first modem unit generates a magnetic field modulated with the first data, and transmits the modulated magnetic field through the RF shield. A second modem unit on a second side of the RF shield receives the modulated magnetic field. The second modem unit demodulates the data from the received magnetic field to recover the data, and outputs the recovered data.

One advantage is that no holes, slots, or window space are required for communications.

Another advantage is that the modem transmits through the RF shielding or RF shielded wall.

Another advantage is that the modem is easily relocated when equipment is rearranged and easily located when new equipment is added.

Another advantage is that the modem is small and easily set-up.

Another advantage is that the modem can be freely positioned in close proximity to both sides of a shielded room wall.

Another advantage is that the modem is capable of transmitting patient parameters, patient monitoring data, and MRI data from a MRI scanner room to a control room.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
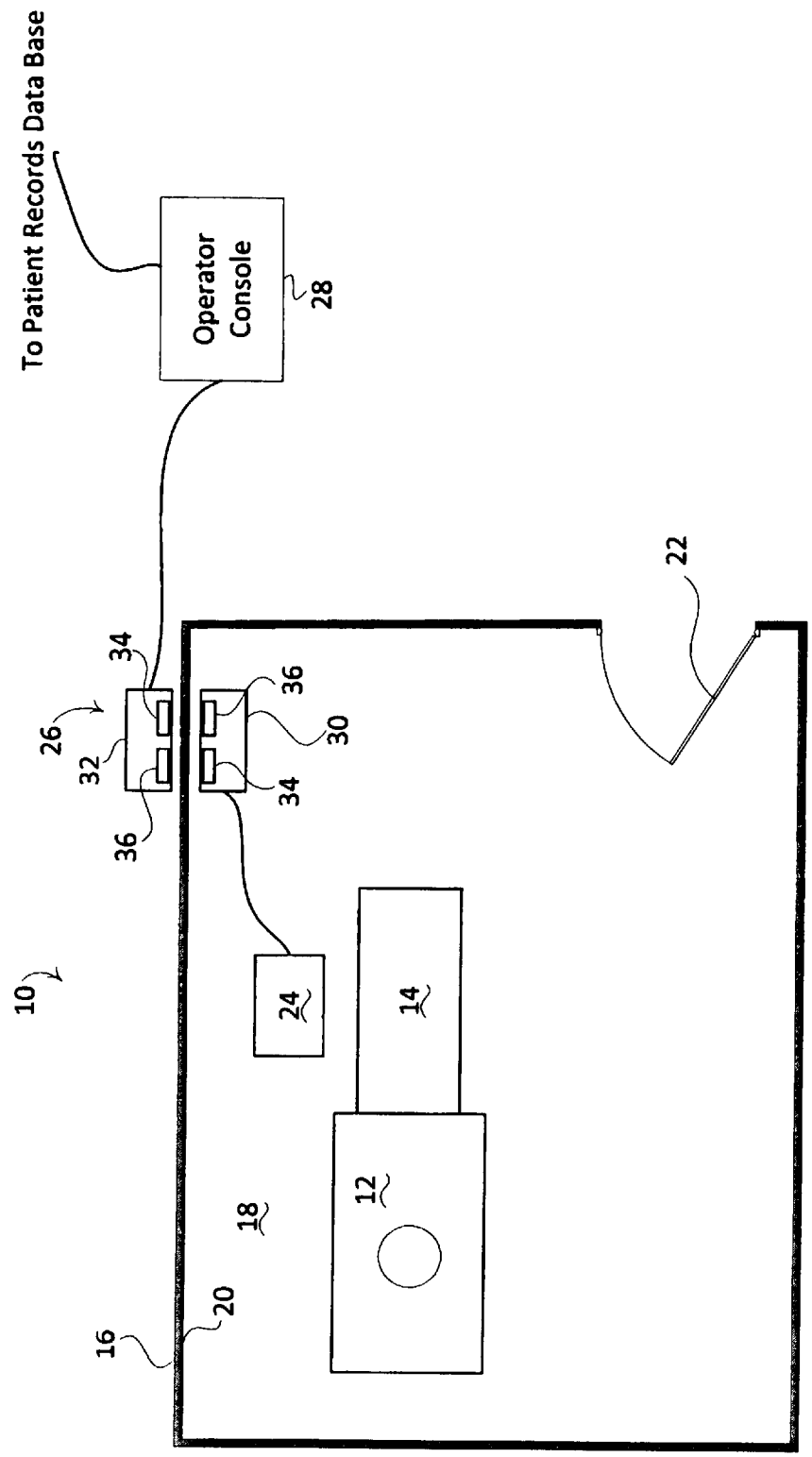
FIG. 1 is a diagrammatic illustration of a shield MR room with the modem.

With reference to FIG. 1, an MR room 10 houses an MR scanner 12 and its associated patient table or support 14. The walls 16, as well as the floor 18 and the ceiling (not shown) are covered with a grounded, electrically conductive surface, such as copper sheets 20 to form a Faraday shield. A door 22, which is large enough to pass a patient gurney, is also shielded. A door latch (not shown) cams the door tightly shut to assure contact between the door and wall shields with no gaps.

An in-room device 24, such as a patient monitoring equipment, an MR control unit, an MR signal output unit, or the like is connected with a magnetic data modem 26. The modem is connected with an operator console 28 which processes data received from the modem to generate displays, store records, or the like and/or sends signals into the MR room through the modem. The magnetic data modem 26 includes like in-room and out-of-room modem units 30 and 32, respectively.

Figure 2:
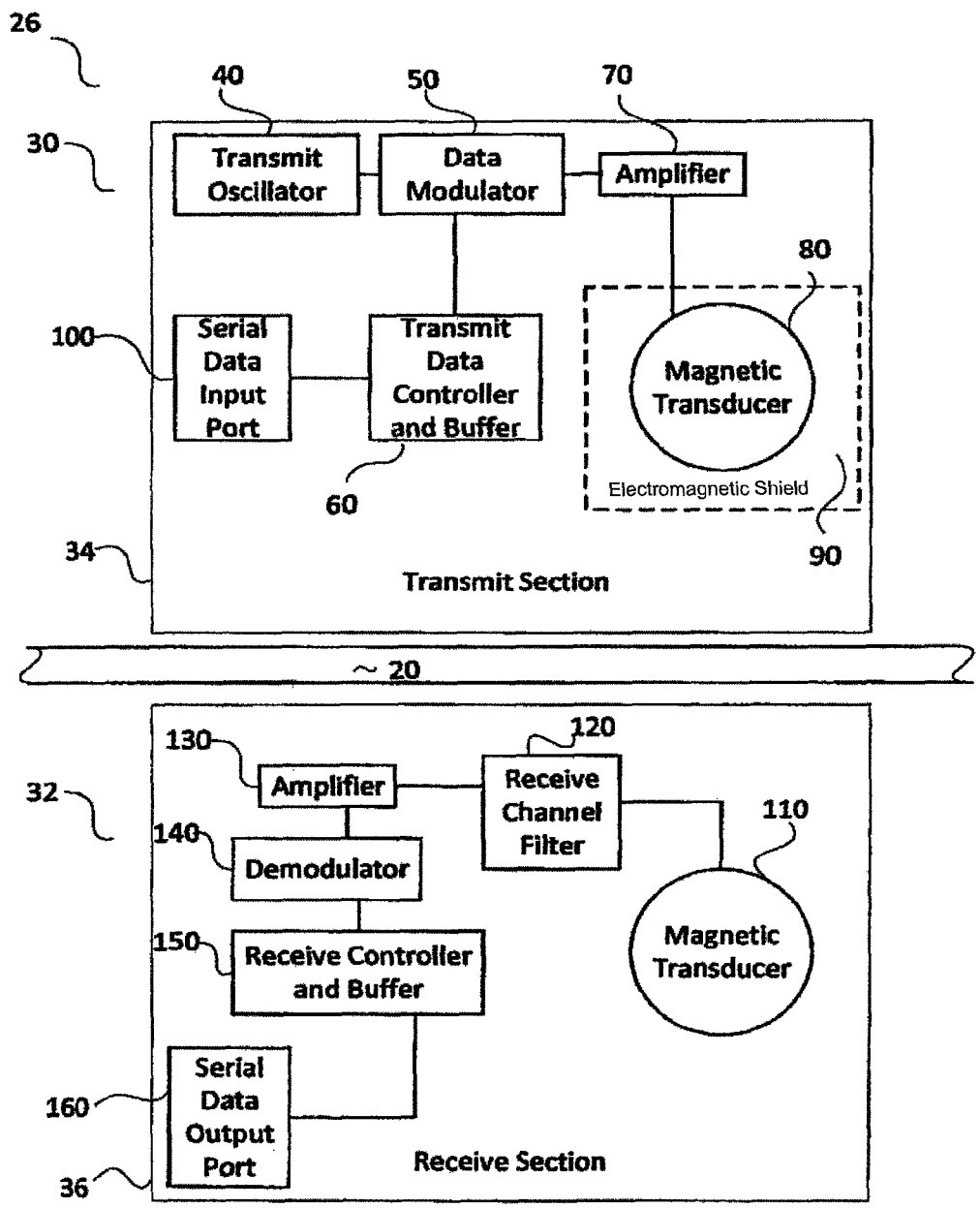
FIG. 2 is a diagram which illustrates one embodiment of the modem.

With reference to FIG. 2, the components of one embodiment of the magnetic data modem 26 are illustrated. For simplicity, a one way modem is illustrated in FIG. 2 in which an in-room unit 30 includes a transmit section 34 and the out-of-room unit 32 includes a receive section 36. Components may be physically arranged differently and shared depending upon the configuration. Of course both the in-room and the out-of-room units can have both transmit and receive sections for two way communication. Likewise, the in-room unit can have only a receive section and the out-of-room unit only a transmit section for one-way communication in the other direction. The transmit section 34 on one side of a RF shielded wall 20 and the receive section 36 on the opposite side of the RF shielded wall is a simplex configuration. In a duplex configuration, both a transmit section 34 and receive section 36 are on each side of a RF shielded wall, which can operate concurrently. In a half-duplex configuration some components of the transmit and receive sections are shared where each modem alternates between operating only as a transmit section 34 or only a receive section 36 at a given point in time.

A transmit oscillator 40 determines the operating frequency modulated by the modem 10. Various frequencies can be used, such as frequencies set aside by the regulatory bodies as ISM (Industrial, Scientific and Medical) allocations. Ideally, the oscillator frequency is different from other oscillator frequencies already in use by the scanner equipment or other equipment in the room.

A data modulator 50 is connected to the transmit oscillator 40 and a controller 60. The controller 60 supplies the next item of data to be transmitted. The data modulator 50 encodes the next item of data on a carrier wave by modulating amplitude, frequency, phase, pulsing or any combination of these which is amplified by an amplifier 70. A magnetic transducer 80 converts the amplified electrical signal to an oscillating magnetic signal. The magnetic signal is weak compared to electromagnetic radiation. The data remains encoded as changes in amplitude, frequency, or pulsing. The magnetic transducer 80 includes a magnetic field antenna. A loop and a solenoid are satisfactory antennas, but other antenna configurations are contemplated.

An electro-magnetic shield 90 surrounds the magnetic transducer 80 at least on the side opposite the RF shielded wall. The electro-magnetic shield 90 includes a conductive mesh or sheet such as copper or aluminum. The electro-magnetic shield 90 blocks the radio frequency electro-magnetic radiation emanating from the magnetic transducer 80 to protect the MRI scanner and other devices within the scanner room. The scanner room wall 20 or Faraday cage wall blocks the electro-magnetic radiation between the modem and the wall, but does not block the magnetic field.

The controller 60 operates to supply the next data item to be encoded by the modulator 50. The controller 60 is connected to an input port 100 such as a serial input data port. The controller 60 uses a memory buffer to hold the data input and to supply the next data item to the data modulator 50. Other embodiments contemplated include a parallel data input with serialization before supplying the next data item to the data modulator 50. The in-room device 24 can convey data to the input port 100 over twisted pair wires, fiber optic, coaxially, or other known data communications techniques. Wireless communication can also be used.

The receive section 36 includes a magnetic transducer 110. The magnetic transducer 110 is tuned for peak sensitivity to the magnetic field frequency of the modem transducer 80. The magnetic transducer 110 converts the magnetic wave to an electric signal which is filtered by a receive channel filter 120. The receive channel filter 120 removes unwanted noise from the signal, e.g. components off from the transmit frequency which is then input to an amplifier 130. The amplifier 130 magnifies the signal from the filter 120 which is processed by a demodulator 140. The demodulator 140 removes the carrier frequency to retrieve the data which the data modulator 50 placed on the carrier frequency from the oscillator 40. The controller 150 places the data unit into a buffer and facilitates transmission to a data output port 160. One embodiment of the output port 160 is a serial port. Other embodiments buffer the demodulated data and convert the data to digital data transmitted in parallel which reflect any connection type or method used in the data input port of the transmitter section.

Figure 3:
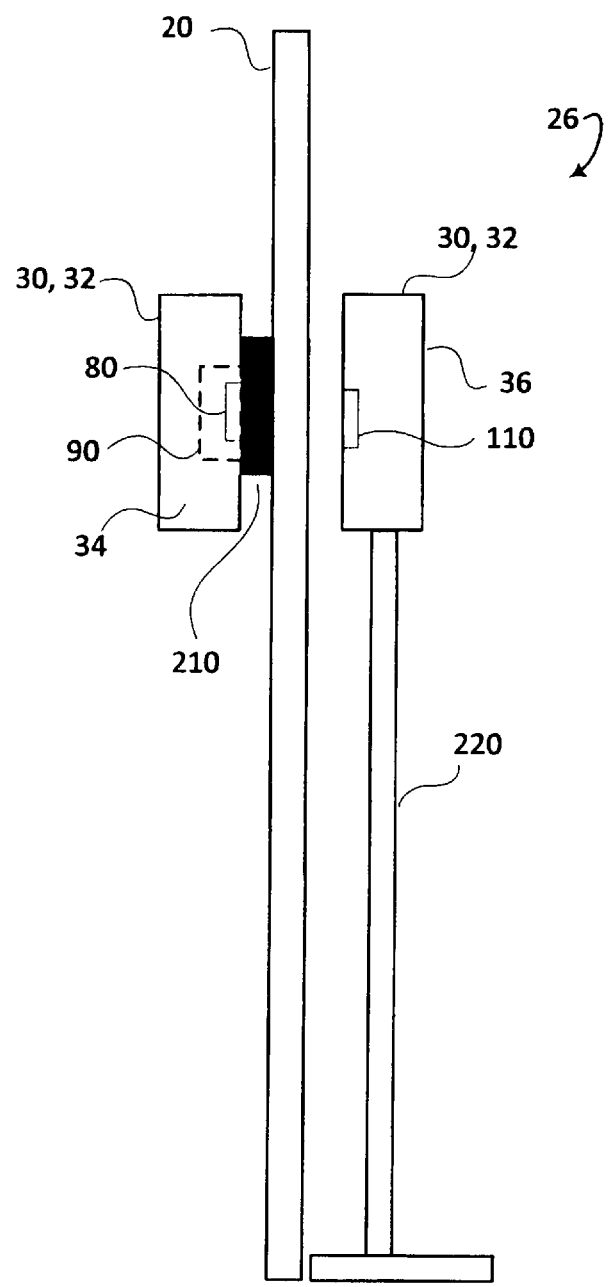
FIG. 3 is a diagram which illustrates two arrangements for placement of a modem on either side of a RF shielded room wall.

With reference to FIG. 3, an embodiment of the modem 26 shows placement relative to the RF shield 20. No penetration of the RF shield 20 or Faraday cage is necessary. In one embodiment, the in-room modem unit 30 and/or the out-of-room unit 32 is affixed to the wall using an adhesive 210. Another embodiment is shown where the out-of-room modem unit 32 and/or the in-room unit 30 are mounted on a stand 220. Precise placement on either side of the wall 16 is not necessary. The magnetic transducers are positioned close enough in proximity where the magnetic field generated on one side of a shield 20 is sensed on the other side of the shield 20. The distance limitations are a function of the strength of the magnetic field generated and the distances between the magnetic transducer 80 of the transmit section 34 and the magnetic transducer 110 of the receive section 36. Minimizing the gap between magnetic transducers 80, 110 maximizes transmission efficiency.

Figure 4:
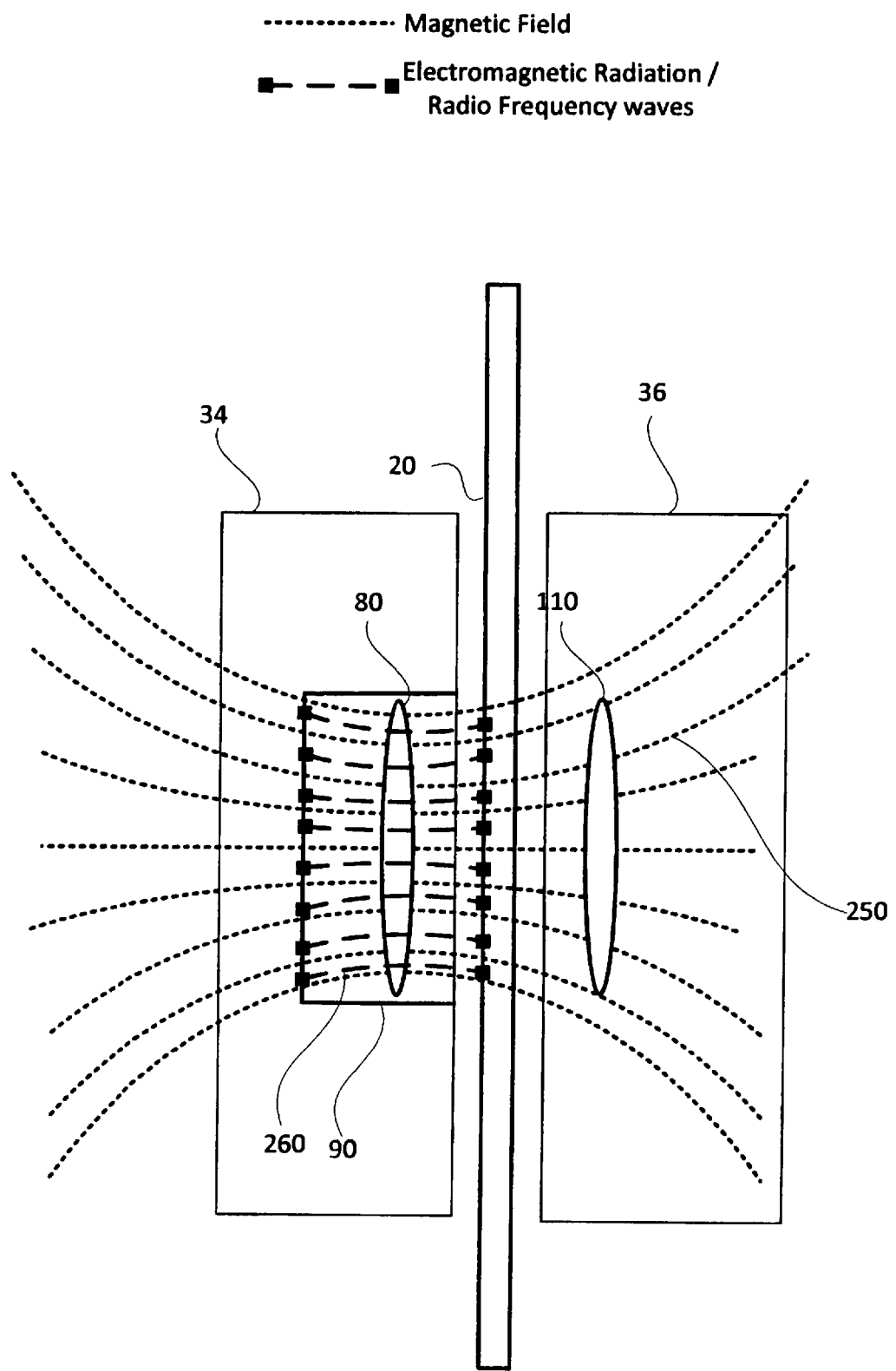
FIG. 4 is a diagram which illustrates the magnetic field generated and the blocked electro-magnetic radiation of one embodiment.

With reference to FIG. 4, a diagram illustrates a generated magnetic field 250 and a generated electromagnetic field 260. The RF shielding 20 or Faraday cage blocks electro-magnetic waves on one side of transmit section 34 of the in-room unit 30. The shielding 90 blocks the RF electro-magnetic radiation going into the scanner room 10. If the transmit section 34 is located on the out-of-room modem unit 32, then the shielding 90 blocks the RF electromagnetic radiation affecting devices located in the control room or other area outside the scanner room. The magnetic field 250 generated by the magnetic transducer 80 of the transmit section 34 of the in-room modem unit 30 is sensed by the magnetic transducer 110 of the receive section 36 of the out-of-room modem unit 32 located on the other side of the RF shield 20.

Figure 5:
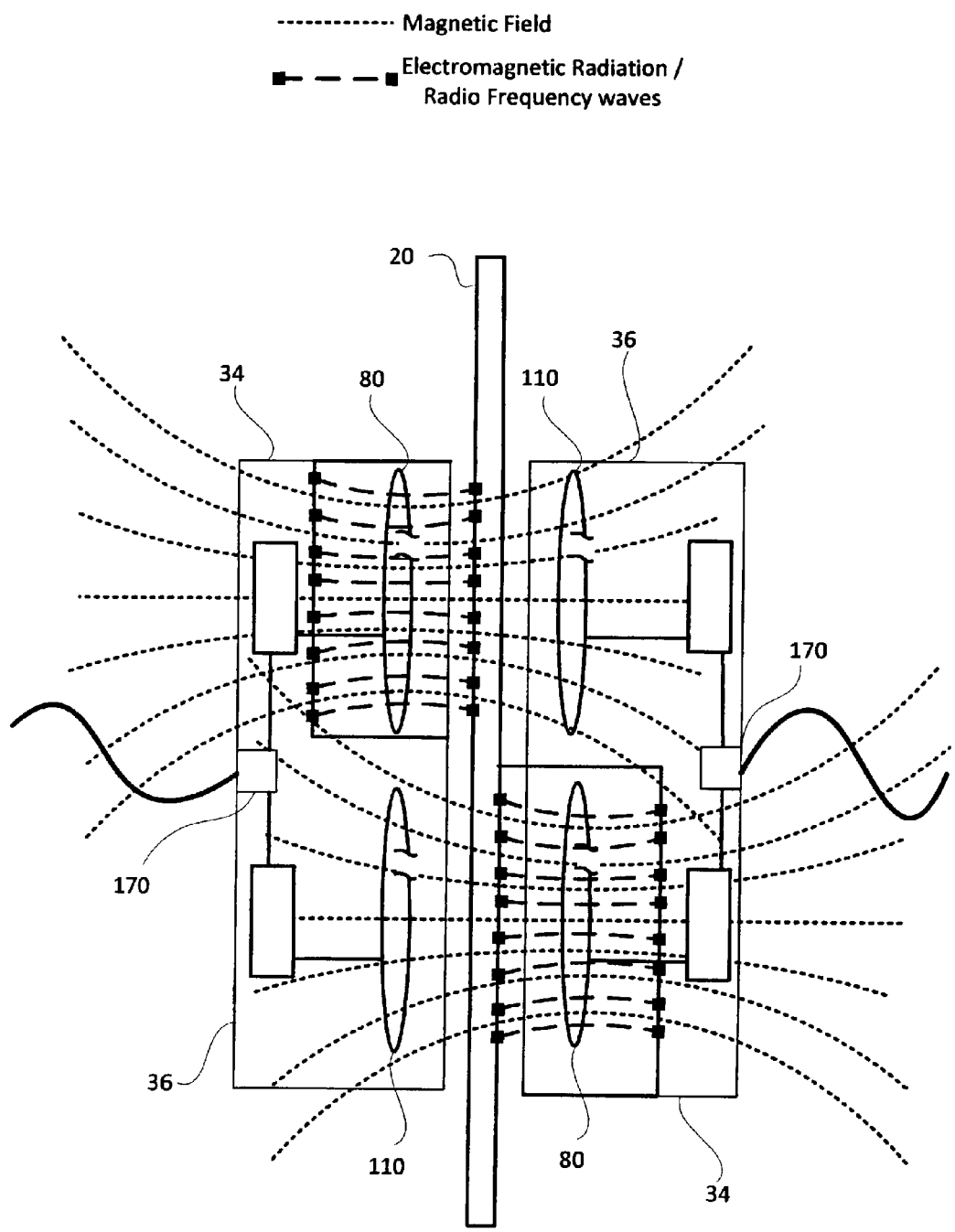
FIG. 5 is a diagram which illustrates the magnetic field generated and the blocked electro-magnetic radiation of a full duplex embodiment.

With reference to FIG. 5, a diagram illustrates generated magnetic fields 250 and generated electromagnetic fields 260 of a duplex configuration. Both the in-room unit and the out-of-room unit include a transmit section 34 and a receive section 36. Both units can transmit and receive data at the same time. The carrier signals need to be different in some aspect for the bi-directional communication. Loop antennas 80, 110 are shown in this example. The data input port and the data output port are combined in this example into a single bi-directional data port 170 for each modem unit 30, 32.

Figure 6:
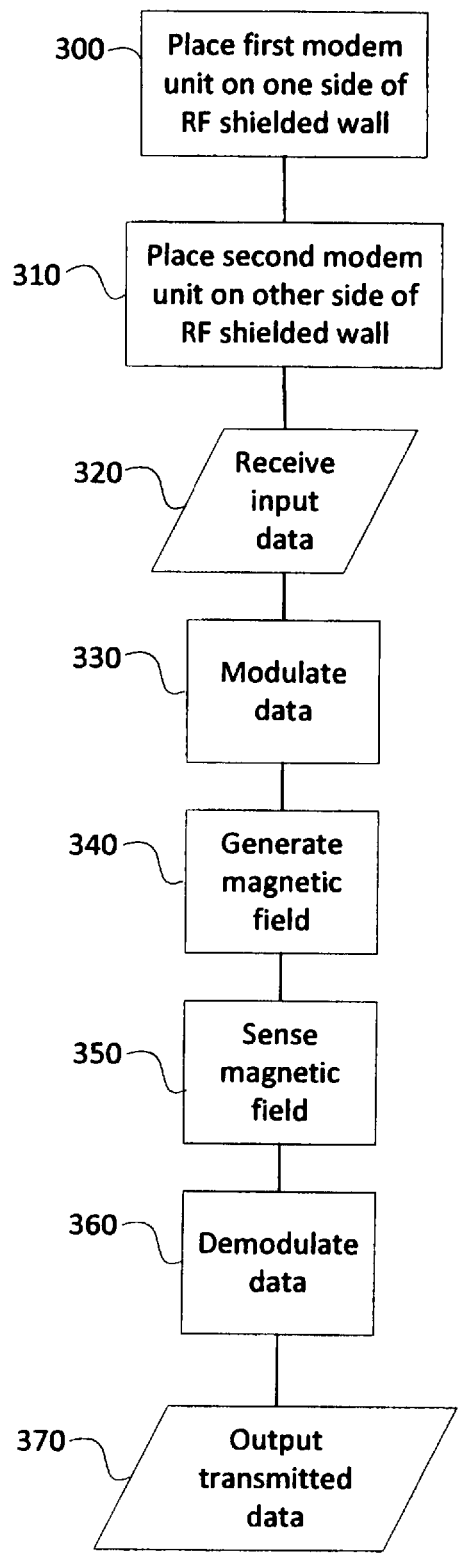
FIG. 6 is a flowchart of a method for using the modem.

With reference to FIG. 6, a flowchart of a method for using the modem 26 is shown. The in-room modem unit 30 is placed on one side of a RF shield in a step 300. The out-of-room modem unit 32 is placed on the other side of the RF shield 20 in a step 310. Steps 300 and 310 can be reversed. Data to be transmitted is received as a step 320 in the input port 100 of at least one of the modem units 30, 32. The input data is modulated in a step 330. The transmit magnetic transducer 80 generates a modulated magnetic field 250 which is transmitted through the shield 20 in a step 340. The magnetic transducer 110 in the receiver section 36 receives the modulated magnetic field in a step 350. The demodulator 140 in the receive section 36 demodulates the received magnetic field transmission and places the data in a buffer as a step 360. The data is then output using the output port 160 as a step 370. If the modem is configured for bi-directional or duplex communication, then steps 330 through 370 are performed for each direction.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A magnetic field modem comprising:
a transmitter section configured to modulate data and transmit the data via a modulated magnetic field;
a receiver section configured to receive the modulated magnetic field and demodulate the data; and
a radio frequency shield interposed between the transmitter section and the receiver section to block a radio frequency electromagnetic transmission from the transmitter section to the receiver section while passing the modulated magnetic field from the transmitter section to the receiver section.

2. The magnetic field modem according to claim 1, wherein the transmitter section further includes:
an oscillator which generates a carrier signal;
a modulator connected to the oscillator which modulates the carrier signal with the input data;
an amplifier connected to the modulator which amplifies the modulated carrier signal; and
a magnetic transducer connected to the amplifier which converts the modulated carrier signal into a modulated magnetic signal.

3. The magnetic field modem according to claim 2, wherein the transmitter section further includes:
an input data port which receives the input data; and
a controller connected to the data modulator and the input data port which makes received input data available to the modulator.

4. The magnetic field modem according to claim 1, wherein the receiver section further includes:
a magnetic transducer which receives the transmitted modulated magnetic field through the radio frequency shield and converts the received modulated magnetic field to a modulated data signal; and
a demodulator which demodulates the data signal to recover the input data.

5. The magnetic field modem according to claim 1, wherein the receiver section further includes:
a controller connected to the demodulator, the controller receives the demodulated input data from the demodulator and stores the input data in a buffer for transmission; and
an output data port which transmits the input data from the buffer.

6. The magnetic field modem according to claim 1, wherein the receiver section further includes:
a channel filter connected to the magnetic transducer which filters unwanted noise from the modulated data signal; and
an amplifier connected to the channel filter.

7. The magnetic field modem according to claim 1, wherein the receiver section and transmitter section are configured in separated units for simplex communication.

8. The magnetic field modem according to claim 1, wherein the modem includes:
(1) a first unit including a first-unit receiver section and the transmitter section; and
(2) a second unit including the receiver section and a second-unit transmitter section; wherein the radio frequency shield is further arranged to block the radio frequency electromagnetic transmission from the second-unit transmitter section to the first-unit receiver section while passing a modulated magnetic field from the second-unit transmitter section to the first-unit receiver section.

9. The magnetic field modem according to claim 8, wherein at least one of:
(I) the transmitter section and the first unit-receiver section of the first unit, and
(II) the receiver section and the second-unit transmitter section of the second unit, share components.

10. The magnetic field modem according to claim 2, wherein the magnetic transducer includes a tuned loop.

11. The magnetic field modem according to claim 1, further including:
a patient monitor device connected with the transmitter section wherein the transmitter section transmits patient monitoring data from the patient monitor device.

12. The magnetic field modem according to claim 1, wherein the radio frequency shield includes a copper sheet.

13. The magnetic field modem according to claim 1, wherein the radio frequency shield includes a non-ferrous conductive mesh.

14. A magnetic resonance suite including:
a room shielded by a radio frequency shield;
a magnetic resonance scanner disposed inside the room; and
a modem comprising:
a radio frequency electromagnetic radiation shielded transmitter section disposed inside the room which modulates data and transmits the data via a modulated magnetic field through the radio frequency shield; and
a receiver section disposed outside the room which receives the modulated magnetic field through the radio frequency shield and demodulates the data:
wherein the radio frequency shield is interposed between the radio frequency electromagnetic radiation shielded transmitter section and the receiver section to block a radio frequency electromagnetic transmission from the transmitter section to the receiver section while passing the modulated magnetic field from the transmitter section to the receiver section.

15. The magnetic resonance suite according to claim 14, wherein the transmitter section further includes:
an oscillator which generates a carrier signal;
a modulator connected to the oscillator which modulates the carrier signal with the input data;
an amplifier connected to the modulator which amplifies the modulated carrier signal; and
a magnetic transducer connected to the amplifier which converts the modulated carrier signal into a modulated magnetic signal.

16. The magnetic resonance suite according to claim 14, wherein the modem includes:
an in-room unit disposed inside the room that includes an in-room receiver section and the radio frequency electromagnetic radiation shielded transmitter section; and
an out-of-room unit disposed outside the room that includes the receiver section and an out-of-room transmitter section.

17. A method for communicating data through a radio frequency (RF) shield, the method comprising:
with a first modem unit on a first side of the RF shield:
receiving first data,
generating a magnetic field modulated with the first data,
transmitting the modulated magnetic field through the RF shield;
with a second modem unit on a second side of the RF shield:
receiving the modulated magnetic field,
demodulating the first data from the received magnetic field to recover the first data, and outputting the recovered first data:

wherein the RF shield is interposed between the first modem unit and the second modem unit to block a radio frequency electromagnetic transmission from the first modem unit to the second modem unit while passing the modulated magnetic field from the first modem unit to the second modem unit.

18. The method for communicating data through a RF shield according to claim 17, further including:

shielding radio frequency a radio frequency electromagnetic radiation emitted from at least the first modem unit.

19. The method for communicating data through a RF shield according to claim 17, further including:

with the second modem unit:

receiving second data, generating a magnetic field modulated with the second data, transmitting the modulated magnetic field through the RF shield;

with the first modem unit:

receiving the modulated magnetic field, demodulating the second data from the received magnetic field to recover the second data, and outputting the recovered second data.

\* \* \* \* \*